United States Patent [19]

Cotteret et al.

[11] Patent Number: 5,134,020

[45] Date of Patent: Jul. 28, 1992

[54] COMPOSITE MATERIAL WITH MULTIPLE INTERPHASES BETWEEN REFRACTORY REINFORCING FIBERS AND CERAMIX MATRIX

[75] Inventors: Jacques Cotteret; Jean-Philippe Rocher, both of St Medard en Jalles; Louis Heraud; Jacques Thebault, both of Bordeaux; Roger Naslain, Pessac, all of France

[73] Assignee: Societe Europeenne De Propulsion, Suresnes, France

[21] Appl. No.: 462,712

[22] Filed: Jan. 9, 1990

[30] Foreign Application Priority Data

Jan. 13, 1989 [FR] France .................. 89 00401

[51] Int. Cl.$^5$ ............................. B32B 9/00
[52] U.S. Cl. ........................ 428/212; 428/245; 428/336; 428/366; 428/367; 428/378; 428/380; 428/384; 428/408; 428/426; 428/432; 428/446; 428/698; 428/689
[58] Field of Search ............ 428/364, 366, 367, 378, 428/245, 379, 380, 384, 698, 408, 699, 432, 446, 336, 212, 375, 426, 689

[56] References Cited

U.S. PATENT DOCUMENTS

| 4,340,636 | 7/1982 | DeBolt et al. | 428/367 |
| 4,397,901 | 8/1983 | Warren | 428/378 |
| 4,405,685 | 9/1983 | Honjo et al. | 428/368 |
| 4,642,271 | 2/1987 | Rice | 428/698 |
| 4,748,079 | 5/1988 | Thebault | 428/367 |
| 4,766,013 | 8/1988 | Warren | 428/367 |
| 4,778,722 | 10/1988 | Yamamura et al. | 428/367 |
| 4,781,993 | 11/1988 | Bhatt | 428/408 |
| 4,869,943 | 9/1989 | Corbin | 428/698 |
| 4,888,310 | 12/1989 | Richon et al. | 428/367 |
| 4,915,760 | 4/1990 | Singh et al. | 428/245 |
| 4,916,092 | 4/1990 | Tiegs et al. | 428/378 |
| 4,931,311 | 6/1990 | Singh et al. | 428/408 |
| 5,021,367 | 6/1991 | Singh et al. | 428/378 |
| 5,026,604 | 6/1991 | Thebault | 428/367 |

FOREIGN PATENT DOCUMENTS

| 0127491 | 12/1984 | European Pat. Off. |
| 0172082 | 2/1986 | European Pat. Off. |
| 2602505 | 2/1988 | France |
| 2080781 | 2/1982 | United Kingdom |

Primary Examiner—Ellis P. Robinson
Assistant Examiner—Archene Turner
Attorney, Agent, or Firm—Weingarten, Schurgin, Gagnebin & Hayes

[57] ABSTRACT

A layer (16) forming interphase in a material having a lamellar structure is situated between the fibers of the texture and the matrix, and at least one layer (14) forming control interphase is situated between the surface of the fibers (10) and the lamellar interphase (16) in such a way as to define, for those cracks which have spread through the matrix (18) and the lamellar interphase (16), a preferential propagation zone away from direct contact with the actual fibers (10).

11 Claims, 6 Drawing Sheets

COMPOSITE MATERIAL WITH MULTIPLE INTERPHASES BETWEEN REFRACTORY REINFORCING FIBERS AND CERAMIX MATRIX

BACKGROUND OF THE INVENTION

1. Field of the Invention

The present invention relates to a composite material having a reinforcing texture in refractory fibers and ceramic matrix with multiple interphases between the fibers of the texture and the matrix.

By refractory fibers is meant here fibers in carbon or in ceramic such as, for example the fibers constituted essentially of silicon carbide.

2. Prior Art

In the composite materials with refractory fibers and ceramic matrix, the fiber-matrix bond conditions the transfer of load and, as a result, the characteristics as well as the mechanical behavior of the materials.

One advantageous way of controlling the load transfer between fiber and matrix consists in interposing a fine layer of a material having a lamellar structure oriented in parallel to the axis of the fiber, as described in U.S. Pat. No. 4,752,503. The layer having the lamellar structure is in a material selected from rough laminar pyrolytic carbon (RL) PyC and boron nitride (BN). As shown diagrammatically in FIG. 1, the layer having a laminar structure constitutes an interphase LI defining two interfaces: one interface between fiber F and the lamellar interphase LI and one interface between said latter and the matrix M.

Without the lamellar interphase, a crack starting in the matrix M spreads directly through the fiber F, as shown in FIG. 2, this leading to a premature breaking of the fiber. The material has a fragile behavior.

When, on the contrary, there is a lamellar interphase, this prevents any cracks starting in the matrix from spreading directly through the fiber. Due to its resiliency under shear stress, the lamellar interphase permits a relaxing of the stresses exerted on the bottom of cracks. The material has a non-fragile behavior and improved mechanical properties, as shown by curve II in FIG. 3 which shows the relation between elongation and tensile strength. By way of comparison, curve I in FIG. 3 shows this relation in the case of a material without lamellar interphase.

The crack remains stopped in the lamellar interphase as long as the level of stress exerted on the bottom of the crack does not exceed the breaking strength of the weakest of the elements found in the immediate vicinity of the crack. Three elements have to be taken into account: the material constituting the lamellar interphase, the matrix-lamellar interphase interface and the fiber-lamellar interphase interface. Depending on which one of said elements has the lowest breaking strength, the progression of the crack will follow path a, b, or c, respectively, when the stress on the bottom of the crack increases, as illustrated in FIG. 4.

The most dangerous progression is that following path c, namely on the fiber-lamellar interphase interface. Indeed, the crack then can reach into the fiber and break it, if it meets with any surface defect of said fiber, which will cause a reduction of the mechanical properties of the composite material.

SUMMARY OF THE INVENTION

It is now the object of the present invention to provide a composite material with lamellar interphase in which the progression of a crack such as to reach and penetrate into a fiber can be avoided.

This object is reached, according to the invention, due to the fact that at least one layer forming control interphase is situated between the surface of the fibers and the lamellar interphase in such a way as to define, for cracks propagated through the matrix and the lamellar interphase, a preferential progression zone out of the direct contact with the actual fibers.

The material constituting the control interphase is selected either from materials having a breaking strength and/or an elongation at break lower than those of the fibers, or from materials whose bonding strength toward the lamellar interphase is sufficiently low for the breaking strength of the interface between control interphase and lamellar interphase to be lower than that of the control interphase. The material of the control interphase is for example a glass, such as silica, a ceramic or a pyrolytic carbon exhibiting low optical activity. When the level of stress is high enough, the crack which has spread through the lamellar interphase is deviated and confined in the control interphase or at the interface between the latter and the lamellar interphase.

An extra layer forming confining interphase can be provided between the fibers and the control interphase in order to complete the confining of a preferential crack progression zone between the confining interphase and the control interphase.

The material constituting the confining interphase is selected either from materials having a breaking strength and/or elongation which are intermediate between those of the fibers and those of the material constituting the control interphase, or from materials whose bonding strength at the control interphase is sufficiently low for the breaking strength of the interface between the confining interphase and the control interphase to be less than that of the confining interphase. Said confining interphase is for example in non-organized carbon.

The presence of the control interphase enables the fibers to remain whole under increasing mechanical stresses, thus improving the mechanical properties of the material according to the invention. Moreover, the cracking path is lengthened, which increases the material resilience. Such increased resilience, hence increased impact strength, results in an extension of curve II in FIG. 3 on the high elongation side, with an increase of the area under said curve which represents the energy at break.

BRIEF DESCRIPTION OF THE DRAWINGS

The invention will be more readily understood on reading the following description of several examples of materials according to the invention, with reference to the accompanying drawings, in which.

DETAILED DESCRIPTION OF PREFERRED EMBODIMENTS

Figure 5:
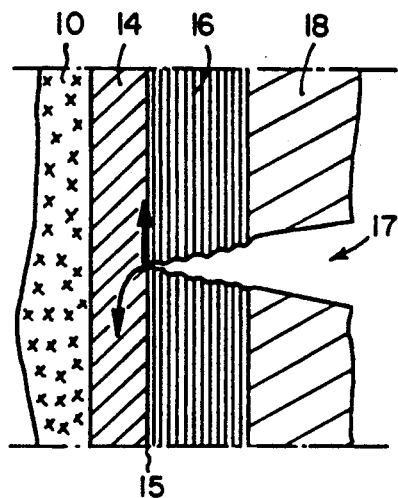
FIGS. 5 and 6 illustrate very diagrammatically the confining of the crack-propagation zone in materials according to two embodiments of the invention.

FIG. 5 illustrates very diagrammatically the fiber-matrix bond in one embodiment of the material according to the invention. Said bond is constituted by a layer 14 in contact with the surface of the refractory fiber 10 and a layer 16 interposed between the layer 14 and the ceramic matrix 18, and contacting with both layer 14 and matrix.

Layer 16, hereinafter called lamellar interphase, is constituted, in manner known per se, by a material with a lamellar structure such as, in particular, rough laminar type pyrolytic carbon, hereinafter designated (RL) PyC, or another carbon well-organized in lamellae, or boron nitride (BN). The lamellar material is oriented in parallel to the axis of fiber 10. The thickness of the lamellar interphase 16 is, for example, between 0.05 and 3 $\mu$m.

The object of layer 14, hereinafter called control interphase, is to confine in a zone outside any contact with the fiber 10, the progression of a crack which has spread through the matrix 18 and the lamellar interphase 16. As shown in FIG. 5, the crack is then deviated and confined in the control interphase or to the interface 15 between the latter and the lamellar interphase.

To this effect, the material constituting the control interphase is selected from:
  materials having a breaking strength under tensile stress and/or an elongation at break lower than those of the fiber; the material of the control interphase then shows a sufficiently high adherence to the fiber for the breaking strength of the fiber-control interphase interface to be higher than that of the control interphase, in order to prevent the crack from reaching said interface, or
  from materials showing a bonding strength toward the lamellar interphase which is sufficiently low for the break strength of the interface between control interphase and lamellar interphase to be lower than that of the control interphase.

Figure 6:
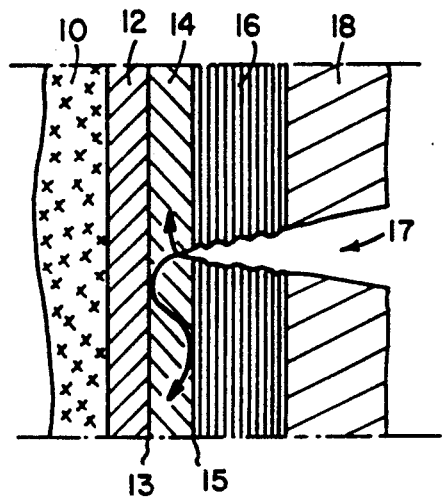

FIG. 6 illustrates very diagrammatically the fiber-matrix bond in another embodiment of the material according to the invention. This other embodiment differs from that illustrated in FIG. 5 only by the interposition of a layer 12, hereinafter called confining interphase, between fiber 10 and the control interphase. The function of said confining interphase is to ensure that the preferential progression zone of a crack having spread through the matrix 18 and the lamellar interphase remains confined between the confining interphase and the lamellar interphase 16. As can be seen in FIG. 6, the propagation of the crack takes place within the control interphase, possibly reaching the interfaces 13 and 15 between said control interphase and the confining and lamellar interphases.

To this effect, the material constituting the confining interphase is selected:
  either from materials having a break strength under tensile stress and an elongation at break which are intermediate between those, higher, of the fiber, and those, lower, of the control layer,
  or from materials showing an adherence to the control interphase which is sufficiently low for the breaking strength of the interface between the confining interphase and the control interphase to be lower than that of the confining interphase.

One essential characteristic of the invention consists in confining the preferential progression of the cracks away from any direct contact with the actual fibers, such as they are in the composite material, namely the fibers originally used for the reinforcement whenever they have undergone no alteration through the densification by the matrix or through any other treatment applied to the reinforcement or to the composite material, or the substantially unmodified center part of the fibers whenever structural or composition modifications have occurred in superficial layers of the fibers during densification or any other treatments.

This particular characteristic makes the composite material according to the invention basically different from the conventional materials in which each fiber is provided with a coating which is loosely bonded to the fiber so as to cause, preferentially, a loosening of the bond between the fiber and the coating around it, under the effect of stresses exerted on the material.

According to the embodiments illustrated in FIGS. 5 and 6, the presence of the control interphase 14, even when limited to a few atomic layers, is sufficient to ensure its function. This explains why the thickness of the control layer is preferably less than 1 $\mu$m, and even less than 0.5 $\mu$m. The same applies to the confining interphase 12 in the embodiment illustrated in FIG. 6.

Figure 7:
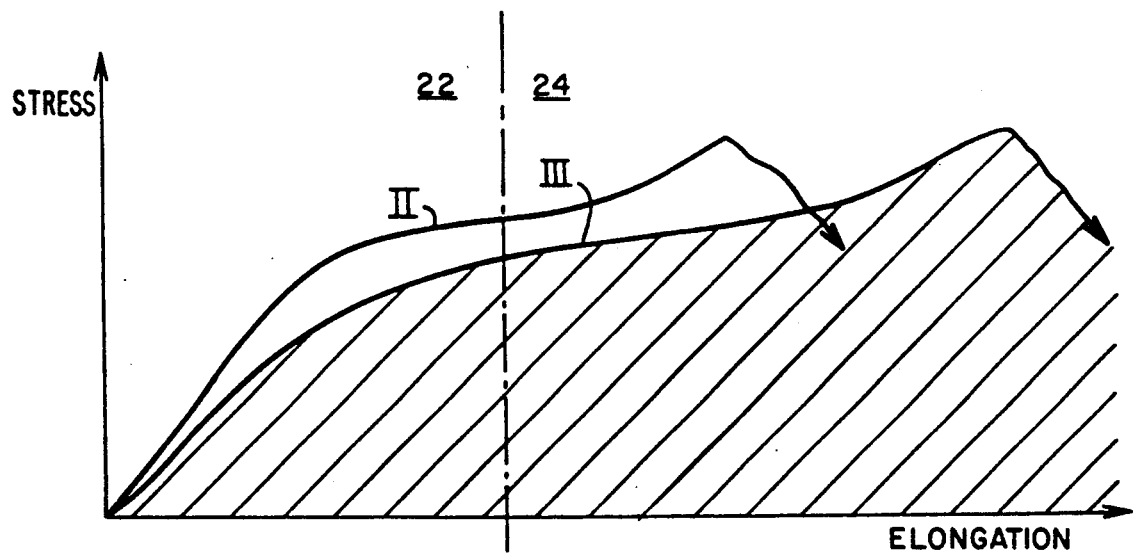
FIG. 7 shows curves giving typical illustrations of the relation between elongation and tensile strength in a material according to the invention and in a material of the prior art, FIGS. 8 and 9 respectively show, for a first example of the material according to the invention, curves which illustrate the result of a structural analysis of the fiber-matrix bond, and a reproduction of a negative of a break pattern obtained by electron microscopy.

The improvement of the impact strength of the materials according to the invention in view of the prior art materials, is illustrated in FIG. 7.

Figure 1:
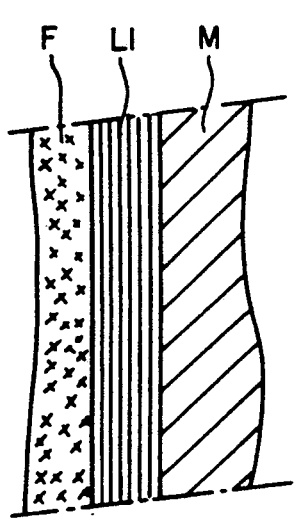
FIGS. 1 to 4, which have already been described, refer to materials of the prior art.
Figure 2:
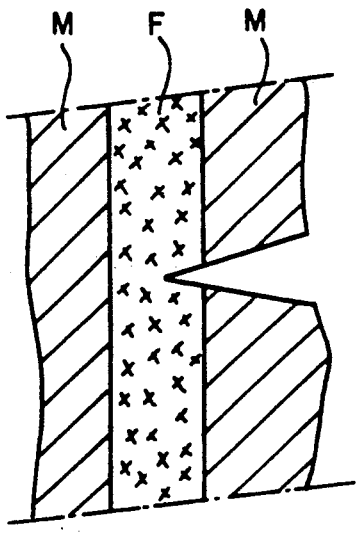
Figure 4:
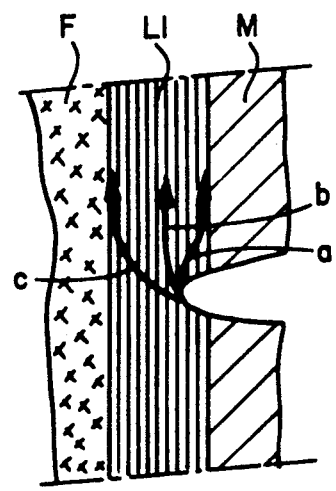
Figure 3:
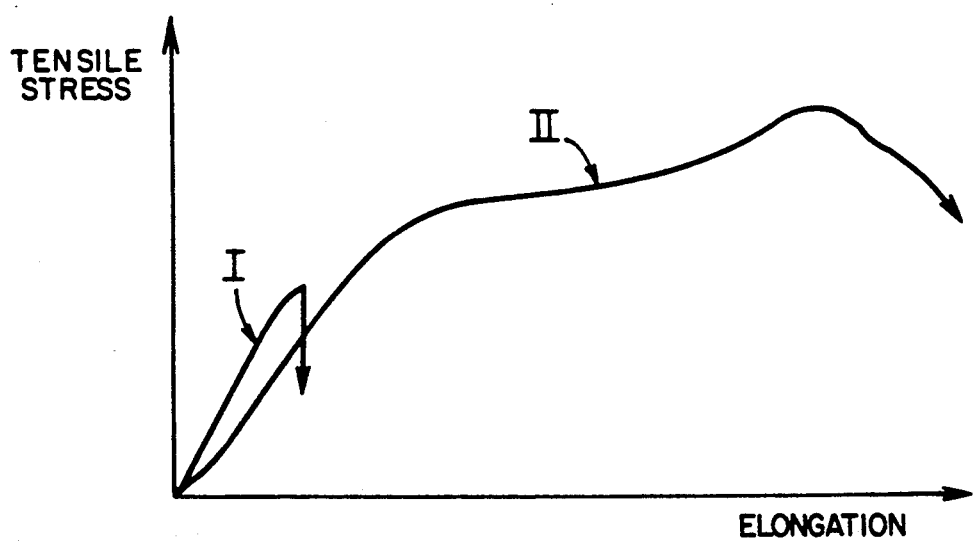

In said Figure, curve II, which is identical to the curve of FIG. 3, is a typical illustration of the relation between tensile strength and elongation for a prior art material having only one lamellar interphase between fiber and matrix whereas curve III is a typical illustration of the relation between tensile strength and elongation for a material according to the invention having a control interphase and a lamellar interphase between fiber and matrix. In a first zone called crack-generation zone (beginning of tensile stresses), the two materials behave in substantially the same way. In the next zone, on the contrary, which zone is called crack-propagation zone, the improvement brought by the invention results in an extension of the curve on the high elongations side, before its progressive drop. In this way, and even in the considered case where the invention brings no substantial increase of the break strength under tensile stress, which is not altogether true as will be seen from the following examples, the increase of the surface area situated under the curve II, results in a corresponding increase of the energy at break, hence of the impact strength.

Various examples of the embodiments of the materials according to the invention and of other materials used by way of comparison are described hereunder.

EXAMPLE 1

A fabric formed of fibers essentially in silicon carbide, hereinafter called SiC fibers, is placed in an atmosphere of tetraethoxysilane (TEOS) and nitrogen under a pressure of 10 torr ($133.10^3 N/m^2$) and the whole is heated to 750 degrees Celsius for 2 hours. At the end of this treatment, a uniform layer of silica ($SiO_2$) has deposited on the fibers forming an even covering of $SiO_2$ of 0.3 μm thickness over each elementary SiC fiber. Layers of fabric, treated in this way, are stacked and placed in an apparatus with the object of obtaining a fiber content of 40%, namely the fraction effectively occupied by the fibers in the apparent volume of the stack of fabric strata.

The layers of treated fabric as held in the apparatus, are placed in an oven in which each fiber already covered with $SiO_2$ is coated with a homogeneous layer of boron nitride (BN) of thickness equal to 0.3 μm. The boron nitride is deposited by the chemical vapor deposition method using a mixture of boron trifluoride ($BF_3$) and ammonia under a pressure of 10 torr ($1,33.10^3 N/m^2$) at a temperature of 950 degrees Celsius.

After formation of the BN layer, the layers of fabric, still held in the apparatus, are placed in a chemical vapor infiltration oven in order to be densified by a silicon carbide matrix (SiC). A method of chemical vapor infiltration of SiC is described in French Patent No. 77 26 979, published under No. 2 401 888.

A composite material according to the invention is then obtained, constituted of: a reinforcement in SiC fibers, an $SiO^2$ interphase, a BN interphase and a SiC matrix. The BN interphase constitutes the lamellar interphase such as this is described in above cited U.S. Pat. No. 4,752,503. The $SiO_2$ interphase constitutes the control interphase which is more fragile in behavior than the SiC fibers.

This material was characterized by a tension test at room temperature. The following properties were measured.

tensile strength to break point ($R_T$): 260 MPa
apparent modulus of elasticity (E): 220 GPa
elongation at break ($\epsilon_R$): 0.78%

Figure 8:
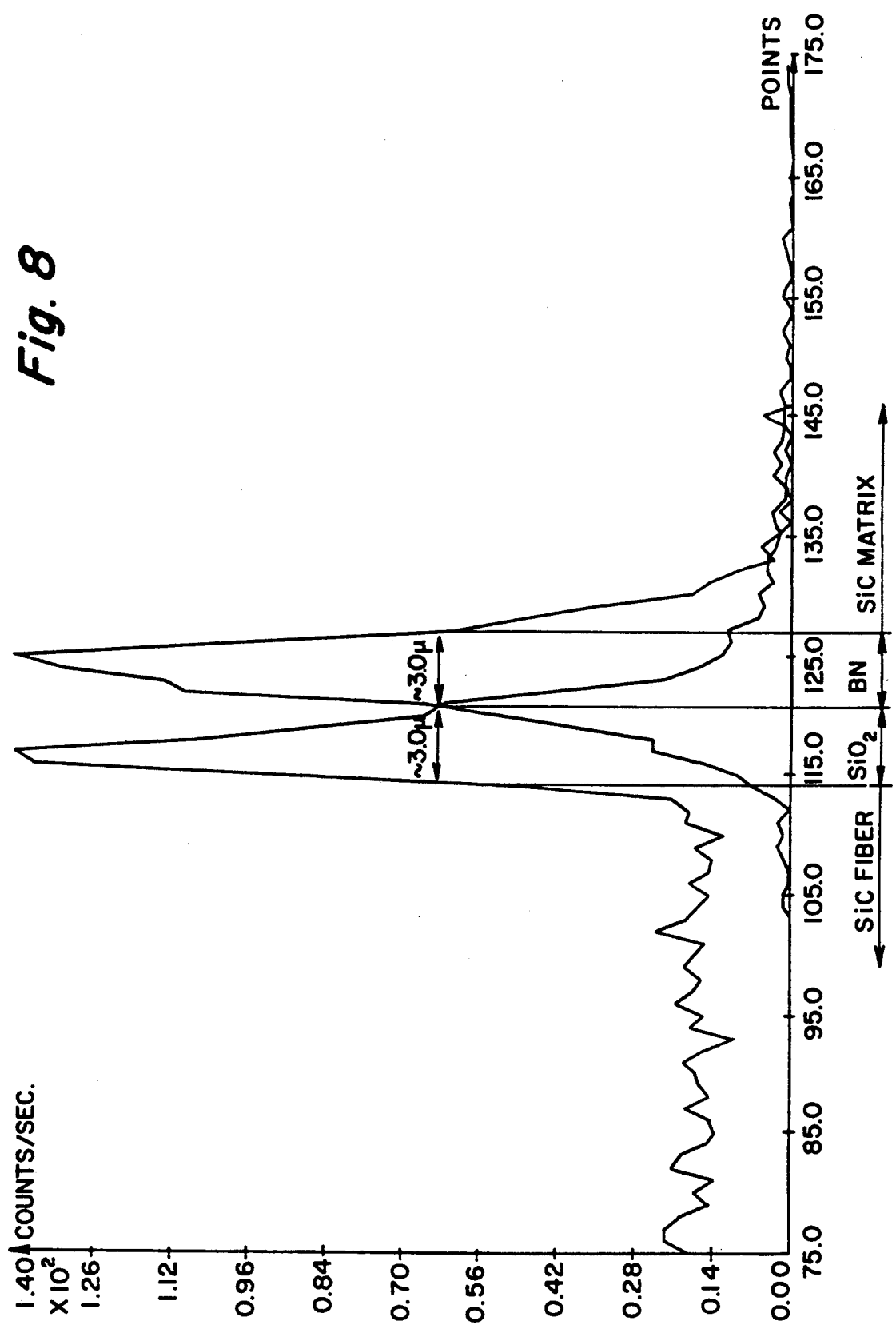

The sequence $SiO_2$-BN to the fiber-matrix bond was visualized by secondary ion mass spectrometry (SIMS) analysis. In FIG. 8, the peaks characterizing the presence of the $SiO_2$ interphase and of the BN interphase are particularly noticeable.

Figure 9:
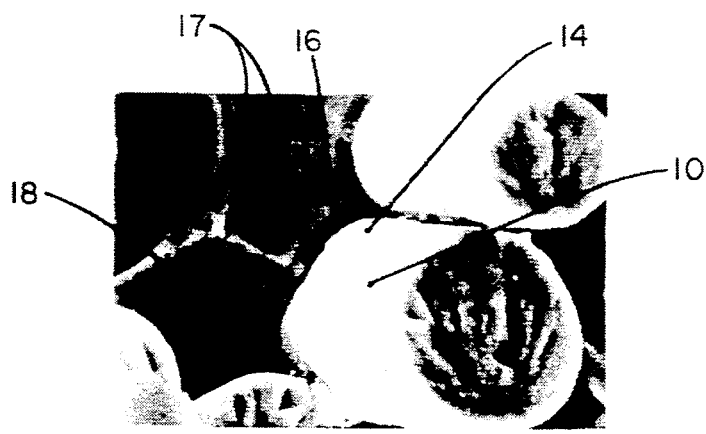

FIG. 9 reproduces the negative of a break pattern in the material, obtained by electron scanning microscopy. It is found that the breaking of the material is localized at the interface between control interphase ($SiO_2$) and lamellar interphase (BN). The $SiO_2$ interphase therefore fulfills efficiently its function which is to localize the zone of propagation of the cracks away from direct contact with the fiber.

EXAMPLE 2

By way of comparison, the same procedure is used as in Example 1, except for the formation of the $SiO_2$ interphase. The characteristics under tension at room temperature of the material SiC reinforcement/BN interphase/SiC matrix which is obtained in this way are as follows:
$R_T$ = 180 MPa
E = 250 GPa
$\epsilon_R$ = 0.30 %

Comparison between Example 1 and Example 2 shows the improvement of the mechanical properties of the material as a result of the presence of the $SiO_2$ control interphase, which improvement is due to the channeling of the cracks at break point. Such improvement is particularly substantial as regards elongation to break point, this implying increased breaking force and impact strength.

EXAMPLE 3

A SiC fabric is placed in an oxidizing atmosphere at a temperature of 800 degrees Celsius in order to form on the surface of each fiber a substantially uniform layer of $SiO_2$ of thickness equal to about 0.08 μm.

Layers of the resultingly oxidized SiC fabric are stacked and placed in an apparatus, and it is then proceeded to the deposition of a BN lamellar interphase and to the chemical vapor deposition of a SiC matrix as in Example 1.

Characterization by tension test at room temperature of the resulting material gives identical results to those obtained to Example 1.

EXAMPLE 4

A fabric in SiC fibers sold by the Japanese Nippon Carbide under the denomination "Nicalon" is subjected to a heat treatment at 1050 degrees Celsius under nitrogen at a pressure of 0.1 torr ($13.33 N/m^2$). After partial decomposition of the fiber, a layer of $SiO_2$ has formed on the periphery of said fiber. Between the layer of $SiO_2$ and the still unaltered SiC fiber, the presence of a fine layer of non-organized carbon is noted, the thickness of said layer being less than 0.03 μm.

Layers of SiC fabric treated as indicated above are stacked and placed in an apparatus, and it is proceeded to the deposition of a BN lamellar interphase and to a chemical vapor deposition of a SiC matrix, as in Example 1.

Characterization of the resulting material, by tension test at room temperature, give the following results:
$R_T$ = 200 MPa
E = 240 GPa
$\epsilon_R$ = 0.6%.

Figure 10:
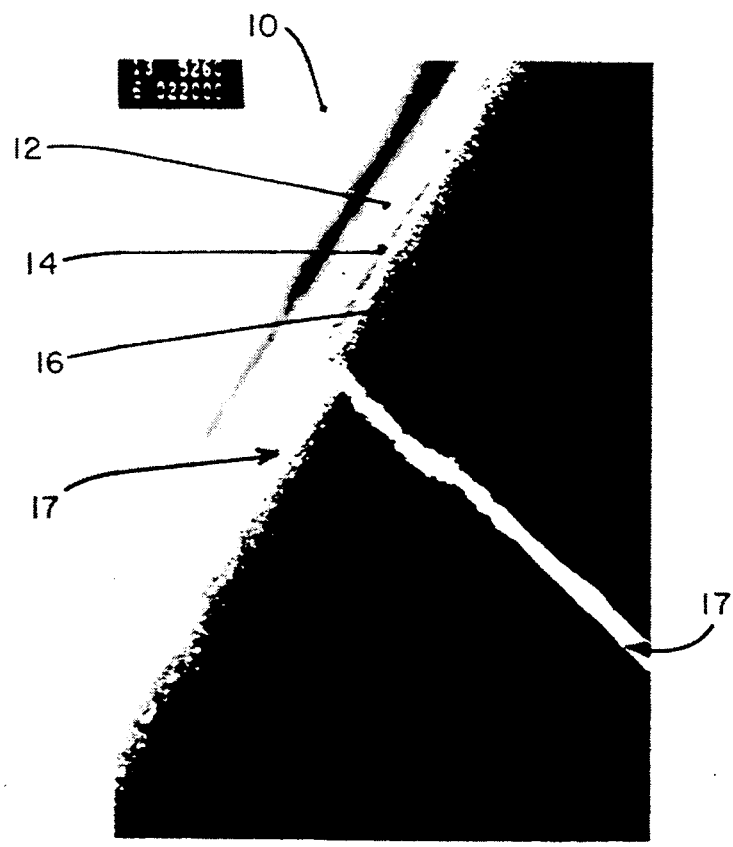
FIGS. 10 and 11 are reproductions of negatives obtained by electron microscopy showing break patterns for two other examples of materials according to the invention, FIGS. 12 and 13 respectively show, for another example of material according to the invention, a reproduction of a negative of a fiber-matrix bond, obtained by light-optical microscopy and a reproduction of a negative of a break pattern obtained by electron microscopy.

The sequence consisting of the layer of non-organized carbon, forming confining interphase, the layer of $SiO_2$, forming control interphase and the lamellar BN interphase, between the fiber and the matrix, was visualized under an electron transmission microscope as illustrated in FIG. 10. It is also shown in said figure that breaking occurred at the interface between the $SiO_2$ interphase and BN interphase.

EXAMPLE 5

A material is obtained, constituted as in Example 1 of SiC reinforcement/$SiO_2$ interphase/BN interphase/SiC matrix but with a lamellar BN interphase of thickness equal to 1 μm. The tension test conducted at room temperature gives the following results:
$R_T$ = 190 MPa
E = 180 GPa
$\epsilon_R$ = 0.5%.

EXAMPLE 6

Layers of SiC fabric are stacked in an apparatus in order to obtain a fiber content of 35%.

The stacked layers of fabric, as held in the apparatus, undergo successively, the following operations:
- deposition on each elementary fiber of a layer of 1 μm of SiC inside a first chemical vapor infiltration oven,
- deposition inside a second chemical vapor infiltration oven of a homogeneous lamellar layer of 1.5 μm thickness of BN which is superposed on the preceding SiC layer,
- densification by an SiC matrix inside the first chemical vapor infiltration oven.

Characterization by tension test at room temperature, of the resulting material, gives the following results:
$R_T = 200$ MPa
$E = 200$ GPa
$\epsilon_R = 0.45\%$.

A comparison of these characteristics with those of the material of Example 2 shows the improvement due to the presence of the SiC layer deposited on the fibers and forming the control interphase which channels the cracks.

Figure 11:

The break pattern observed under an electron scanning microscope, as can be seen in FIG. 11, shows a noticeable reduction of bonding between the SiC control interphase and the lamellar BN interphase.

EXAMPLE 7

Layers of SiC fabric are placed in an apparatus so as to obtain a fiber content of 43%.

The stacked layers of fabric, as held in the apparatus, are placed in a chemical vapor infiltration oven in order to form successively:
- a layer of smooth laminar type pyrolytic carbon, or (SL) PyC, of 0.5 μm thickness which is deposited over each elementary fiber,
- a layer of rough laminar type pyrolytic carbon (RL) PyC, of lamellar structure, of 0.5 μm thickness which is superposed to the (SL)PyC layer.

The layers of fabric with the (SL) PyC and (RL) PyC coatings, still held in the apparatus are then placed in a chemical vapor infiltration oven for densification by a SiC matrix.

A tension test conducted on the resulting material, at room temperature, gives the following results:
$R_T = 180$ MPa
$E = 180$ GPa
$\epsilon_R = 0.5\%$.

Figure 12:
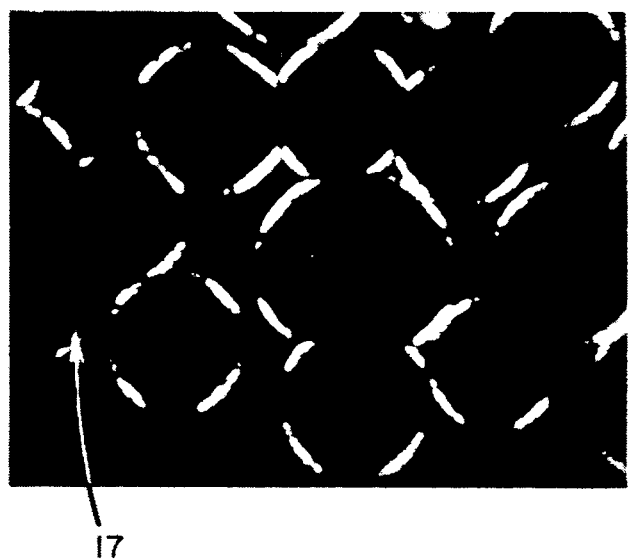

The (SL) PyC-(RL) PyC sequence between fiber and matrix was observed by light-optical microscopy as illustrated in FIG. 12.

Figure 13:
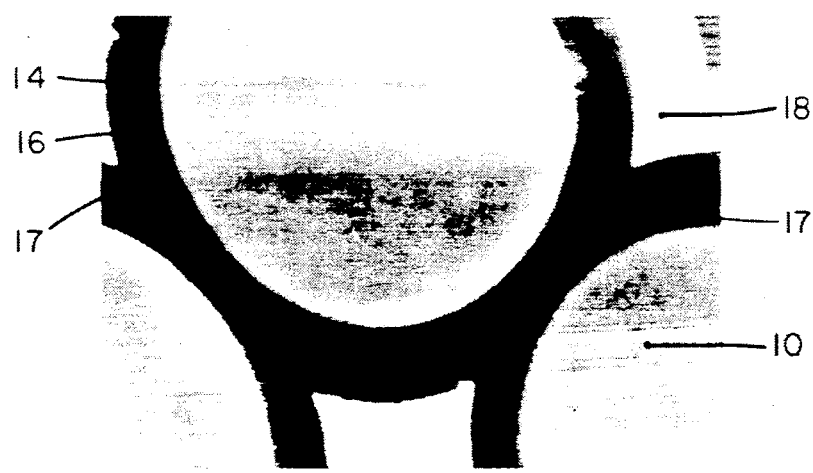

Observation of a break pattern under an electron scanning microscope, as shown in FIG. 13, reveals that the crack is localized on the interface between the (SL) PyC layer, forming control interphase, and the (RL) PyC layer, forming lamellar interphase.

EXAMPLE 8

For comparison, the procedure used is as in Example 7, except that only one (RL)PyC layer of thickness equal to 1 μm is formed on each elementary fiber instead of the two (SL) PyC and (RL) PyC layers of thickness equal to 0.5 μm each.

Characterization of the resulting material by tension test at room temperature gives the following results:
$R_T = 180$ MPa
$E = 180$ GPa
$\epsilon_R = 0.3\%$.

Figure 14:
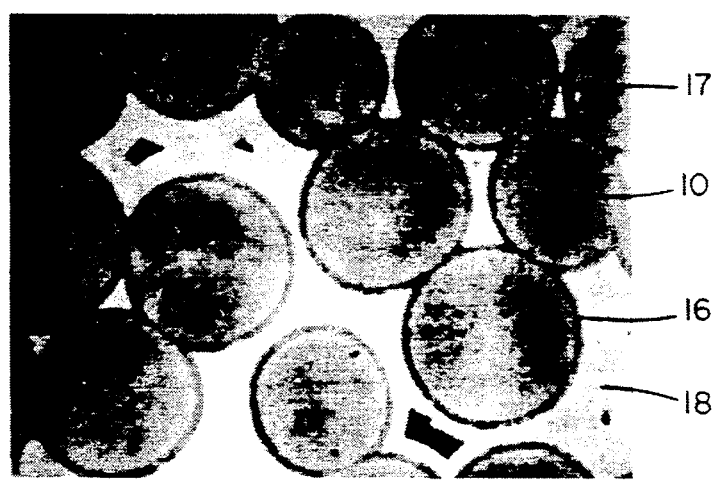
FIGS. 14 and 15 show reproductions of negatives of a break pattern obtained by electron microscopy for yet another example of a material according to the invention and for a material not according to the invention.

Observation of a break pattern under an electron scanning microscope, as shown in FIG. 14, reveals that the crack propagates on the interface between the SiC fibers and the lamellar (RL) PyC interphase.

A comparison between Example 7 and Example 8 reveals an increase of the elongation at break obtained due to the presence of the (SL) PyC control interphase permitting the localization of the crack to the (SL) PyC-(RL) PyC interface. As already indicated, said increase results in a higher energy at break and a better impact strength, even though in this example, $R_T$ has not increased.

EXAMPLE 9

Layers of SiC fabric are placed in an apparatus, so as to obtain a fiber content of 40%, then they are introduced in a chemical vapor infiltration oven in order to deposit on each elementary fiber, successively, a PyC layer of 0.2 μm thickness and a BN layer of 0.2 μm thickness superposed thereon. Then a densification is carried out, in the same oven, by chemical vapor infiltration of an SiC matrix. The tension test conducted at room temperature on the resulting material gives the following results:
$R_T = 170$ MPa
$E = 200$ GPa
$\epsilon_R = 0.48\%$.

Figure 15:

A comparison with Example 8 reveals the improvement due to the combination of the PyC layer forming control interphase with the BN layer forming lamellar interphase. The observation of a break pattern under an electron scanning microscope, as shown in FIG. 15, reveals that the crack is localized on the PyC-BN interface, the breaking strength at that interface being therefore less than that of the PyC layer and that of the interface between the fiber and the PyC layer.

EXAMPLE 10

Layers of fabric in SiC fibers sold by the Japanese company "Nippon Carbon" under the denomination "Nicalon", are placed in an apparatus in order to obtain a fiber content of 43%.

The stacked layers, as held in the apparatus, are placed in a chemical vapor infiltration oven for densification by a SiC matrix.

When the densification is completed, the resulting SiC/SiC composite material is heat-treated under argon at a temperature of 1200 degrees Celsius for 10 hours.

The tension test conducted on the resulting material at room temperature, gives the following results:
$R_T = 180$ MPa
$E = 200$ GPa
$\epsilon_R = 0.6\%$.

Observation of the bond between fiber and matrix under an electron transmission microscope has revealed the presence of the following sequence: SiC fiber-layer of non-organized carbon-layer of amorphous $SiO_2$-layer of organized carbon with structure in lamellae of 0.1 μm thickness-SiC matrix.

The material therefore is found to contain multiple interphases forming a sequence of the same type as that of the material obtained in Example 4, the only difference being the replacement of the lamellar BN interphase by a lamellar interphase constituted by a well-organized layer of lamellar carbon produced during the heat-treatment.

ASTM standardized impact tests conducted with a Charpy pile driver ram have shown that the material has an impact strength higher than 4 J/cm2, the limit of the testing machine used, the material not being broken after one, and even more impacts.

EXAMPLE 11

The same procedure is used as in Example 10 with the exception of the heat treatment on the SiC/SiC material.

The tension test conducted a room temperature gives the following results:
$R_T = 130$ MPa
$E = 200$ MPa
$\epsilon_R = 0.1\%$.

The observation of the fiber-matrix bond under an electron transmission microscope reveals the existence of the following sequence: SiC fiber-non-organized layer of carbon-layer of amorphous $SiO_2$ in parts only-SiC matrix.

An impact test conducted with the Charpy ram has shown that the material had an impact strength equal to about 1.13 J/cm2.

A comparison between Examples 10 and 11 shows that the heat treatment carried out on the SiC/SiC composite induces the formation of an even layer of $SiO_2$ acting as control interphase and an even layer of carbon well organized in lamellae, which confers to the material a high impact strength by localization of the cracks in the interface of $SiO_2$ and well-organized carbon. The layer of non-organized carbon situated between the fiber and the $SiO_2$ layer then acts as a confining interphase.

All the foregoing examples show the role of the control interphase in preserving fibers from cracks which have spread through the matrix and the lamellar interphase. It is also observed that the presence of the control interphase quite obviously causes a preferential channeling of the cracks on the interface between control interphase and lamellar interphase.

What is claimed is:

1. A composite material having a reinforcing fibrous texture made of refractory fibers and a ceramic matrix, comprising:
    a homogeneous lamellar interphase layer oriented in parallel to the axis of said refractory fibers provided between the surface of the fibers of the reinforcing texture and the matrix, said lamellar interphase layer being a material having a lamellar structure selected from the group consisting of boron nitride, pyrolytic carbon of rough laminar and carbon organized in lamellae, wherein said interphase layer has a thickness sufficient to reduce the susceptibility of the composite to crack propagation and to increase impact strength and is elastically deformable in shear and has an elongation at break greater than the matrix, and
    a uniform control interphase layer provided between the surface of the fibers of the reinforcing texture and the lamellar interphase layer, the control interphase layer contacting the lamellar interphase layer and being a material selected either from materials having a breaking strength or elongation at break less than those of the reinforcing texture, or from materials whose bonding strength toward the lamellar interphase layer is sufficiently low for the breaking strength of the interface between the control interphase layer and the lamellar interphase layer to be lower than that of the control interphase layer,
    whereby said control interphase layer defines, for cracks which have propagated through the matrix and the lamellar interphase layer, a zone of preferential progression away from direct contact with the actual fibers of the reinforcing texture.

2. A composite material as claimed in claim 1, wherein the material constituting the control interphase layer is selected from the group consisting of glass, ceramics, and low optical activity pyrolytic carbons.

3. A composite material as claimed in claim 1, wherein the material constituting the control interphase layer is silica.

4. A composite material as claimed in claim 1, wherein the thickness of the control interphase layer is less than 1 μm.

5. A composite material as claimed in claim 1 and further comprising a confining interphase layer provided between the surface of the fibers of the reinforcing texture and the control interphase layer,
    the confining interphase layer being in a material selected either from materials having a breaking strength and elongation at break intermediate between those of the fibers of the reinforcing texture and those of the material of the control interphase layer, or from materials whose bonding strength toward the control interphase layer is sufficiently low for the breaking strength of the interface between the confining interphase layer and the control interphase layer to be lower than that of the confining interphase layer,
    whereby a preferential progression zone for a crack having spread through the matrix and the lamellar interphase layer is confined between the confining interphase layer and the lamellar interphase layer.

6. A composite material as claimed in claim 5 wherein the material constituting the confining interphase layer is non-organized carbon.

7. A composite material having a reinforcing fibrous texture made of refractory fibers, a ceramic matrix, and a plurality of interphase layers provided between the fibers and matrix, said interphase layers including, successively, from the surface of the fibers to the matrix:
    a uniform first interphase layer of a material selected from the group consisting of glass, ceramics, and low-optical activity pyrolytic carbon, and
    a homogeneous second contiguous lamellar interphase layer oriented in parallel to the axis of said refractory fibers of a material selected from the group consisting of boron nitride, pyrolytic carbon of rough laminar, wherein said second interphase layer has a thickness sufficient to reduce the susceptibility of the composite to crack propagation and to increase impact strength and is elastically deformable in shear and has an elongation at break greater than the matrix and carbon organized in lamellae,
    the first interphase layer controlling the propagation of any cracks which have spread through the matrix and through the lamellar interphase layer in such a way as to confine said cracks away from direct contact with the fibers of the reinforcing texture, the first interphase layer being a material selected either from materials having a breaking strength or elongation at break less than those of the reinforcing texture, or from materials whose bonding strength toward the second interphase layer is sufficiently low for the breaking strength of the interface between the first interphase layer and the second interphase layer to be lower than that of the first interphase layer.

8. A composite material as claimed in claim 7, wherein the fibers of the reinforcing texture are essentially silicon carbide.

9. A composite material as claimed in claim 7, wherein the matrix is silicon carbide.

10. A composite material as claimed in claim 7, wherein the first interphase layer is silica.

11. A composite material as claimed in claim 7, further comprising a uniform third interphase layer provided between the fibers of the reinforcing texture and the second interphase layer, contiguously to the latter, said third interphase layer being carbon in non-organized form.

* * * * *